(12) United States Patent
Hogg et al.

(10) Patent No.: US 9,818,103 B2
(45) Date of Patent: *Nov. 14, 2017

(54) SECURE EXCHANGE OF INDICIA OF VALUE AND ASSOCIATED INFORMATION

(75) Inventors: Jason J. Hogg, St. Petersburg, FL (US); Winter P. Ng, Tampa, FL (US)

(73) Assignee: AMERICAN EXPRESS TRAVEL RELATED SERVICES COMPANY, INC., New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 13/026,024

(22) Filed: Feb. 11, 2011

(65) Prior Publication Data

US 2011/0246365 A1 Oct. 6, 2011

Related U.S. Application Data

(60) Provisional application No. 61/321,493, filed on Apr. 6, 2010.

(51) Int. Cl.
*G06Q 40/00* (2012.01)
*G06Q 20/28* (2012.01)
(Continued)

(52) U.S. Cl.
CPC .......... *G06Q 20/28* (2013.01); *G06Q 20/065* (2013.01); *G06Q 20/40* (2013.01); *G06Q 30/02* (2013.01); *G06Q 30/0207* (2013.01)

(58) Field of Classification Search
None
See application file for complete search history.

(56) References Cited

U.S. PATENT DOCUMENTS

| 4,408,203 A | 10/1983 | Campbell |
| 4,797,920 A | 1/1989 | Stein |

(Continued)

FOREIGN PATENT DOCUMENTS

| KR | 1020000064158 | 11/2000 |
| KR | 1020010065400 | 7/2001 |

(Continued)

OTHER PUBLICATIONS

U.S.; Advisory Action dated Sep. 28, 2011 in U.S. Appl. No. 12/054,164.

(Continued)

*Primary Examiner* — Olabode Akintola
(74) *Attorney, Agent, or Firm* — Snell & Wilmer L.L.P.

(57) ABSTRACT

Secure exchange of value and associated information in financial transactions involving beneficial offers available for customers is provided. Various offers, including discounts, prepaid amounts, and the like may be purchased by customers for use with various merchants. A third party issuer obtains information from the customer in selling the offers and issues some kind of indicium of value having a representation of the value of the offer associated therein. Record of the indicia are maintained and either transmitted to the merchant or kept by the issuer or associated financial institutions. When the customer redeems the offer by presenting the indicium to the merchant, the merchant may either authenticate the indicium using the records received by the issuer, or establish communication with the issuer for the issuer to authenticate the indicium, either by itself or in cooperation with one or more related financial institutions.

8 Claims, 11 Drawing Sheets

(51) Int. Cl.
  *G06Q 20/06* (2012.01)
  *G06Q 20/40* (2012.01)
  *G06Q 30/02* (2012.01)

(56) References Cited

U.S. PATENT DOCUMENTS

| | | |
|---|---|---|
| 4,906,826 A | 3/1990 | Spencer |
| 4,908,521 A | 3/1990 | Boggan et al. |
| 4,943,707 A | 7/1990 | Boggan |
| 5,136,633 A | 8/1992 | Tejada et al. |
| 5,177,342 A | 1/1993 | Adams |
| 5,255,182 A | 10/1993 | Adams |
| 5,396,624 A | 3/1995 | Campbell, Jr. |
| 5,455,406 A | 10/1995 | Terashima et al. |
| 5,557,516 A | 9/1996 | Hogan |
| 5,692,132 A | 11/1997 | Hogan |
| 5,699,528 A | 12/1997 | Hogan |
| 5,703,344 A | 12/1997 | Bezy et al. |
| 5,704,046 A | 12/1997 | Hogan |
| 5,715,314 A | 2/1998 | Payne et al. |
| 5,761,306 A | 6/1998 | Lewis |
| 5,878,215 A | 3/1999 | Kling et al. |
| RE36,365 E | 11/1999 | Levine et al. |
| 6,018,723 A | 1/2000 | Siegel et al. |
| RE36,788 E | 7/2000 | Mansvelt et al. |
| 6,119,103 A | 9/2000 | Basch et al. |
| RE37,122 E | 4/2001 | Levine et al. |
| 6,298,336 B1 | 10/2001 | Davis et al. |
| 6,315,193 B1 | 11/2001 | Hogan |
| 6,381,315 B1 | 4/2002 | Nhaissi |
| 6,457,005 B1 | 9/2002 | Torrey |
| 6,473,500 B1 | 10/2002 | Risafi et al. |
| 6,560,581 B1 | 5/2003 | Fox et al. |
| 6,578,768 B1 | 6/2003 | Binder et al. |
| 6,604,107 B1 | 8/2003 | Wang et al. |
| RE38,255 E | 9/2003 | Levine et al. |
| 6,681,328 B1 | 1/2004 | Harris et al. |
| 6,732,161 B1 | 5/2004 | Hess et al. |
| 6,748,367 B1 | 6/2004 | Lee |
| 6,793,131 B2 | 9/2004 | Hogan |
| 6,857,566 B2 | 2/2005 | Wankmueller |
| 6,915,279 B2 | 7/2005 | Hogan et al. |
| 6,938,013 B1 | 8/2005 | Gutierrez-Sheris |
| 6,957,334 B1 | 10/2005 | Goldstein et al. |
| 6,990,470 B2 | 1/2006 | Hogan et al. |
| 6,999,569 B2 | 2/2006 | Risafi et al. |
| 7,031,939 B1 | 4/2006 | Gallagher et al. |
| 7,039,809 B1 | 5/2006 | Wankmueller |
| 7,058,611 B2 | 6/2006 | Kranzley et al. |
| 7,080,328 B1 | 7/2006 | Sawyer |
| 7,089,208 B1 | 8/2006 | Levchin et al. |
| 7,120,608 B1 | 10/2006 | Gallagher et al. |
| 7,146,344 B2 | 12/2006 | Wankmueller |
| 7,152,782 B2 | 12/2006 | Shenker et al. |
| 7,168,615 B2 * | 1/2007 | Smith .................... G06Q 20/04 235/379 |
| 7,177,848 B2 | 2/2007 | Hogan et al. |
| 7,191,151 B1 | 3/2007 | Nosek |
| 7,227,950 B2 | 6/2007 | Faith et al. |
| 7,249,093 B1 | 7/2007 | King |
| 7,249,094 B2 | 7/2007 | Levchin et al. |
| 7,252,226 B2 | 8/2007 | Risafi et al. |
| 7,287,695 B2 | 10/2007 | Wankmueller |
| 7,290,364 B2 | 11/2007 | Nelms et al. |
| 7,299,206 B2 | 11/2007 | Taylor et al. |
| 7,299,974 B2 | 11/2007 | Smets et al. |
| 7,318,049 B2 | 1/2008 | Iannacci |
| 7,320,021 B2 | 1/2008 | Lalonde et al. |
| 7,340,429 B2 | 3/2008 | Maltzman |
| 7,343,335 B1 | 3/2008 | Olliphant |
| 7,350,192 B2 | 3/2008 | Seitz et al. |
| 7,356,507 B2 | 4/2008 | Bezos et al. |
| 7,369,505 B2 | 5/2008 | Mengerink |
| 7,370,011 B2 | 5/2008 | Bennett et al. |
| 7,373,317 B1 | 5/2008 | Kopelman et al. |
| 7,373,319 B2 | 5/2008 | Kopelman et al. |
| 7,373,329 B2 | 5/2008 | Gallagher et al. |
| 7,374,082 B2 | 5/2008 | Van De Velde et al. |
| 7,379,919 B2 | 5/2008 | Hogan et al. |
| 7,406,464 B2 | 7/2008 | Kasten et al. |
| 7,406,529 B2 | 7/2008 | Reed |
| 8,083,133 B2 * | 12/2011 | Seifert .................... G06Q 20/10 235/379 |
| 9,208,485 B2 | 12/2015 | Kerner et al. |
| 2002/0194124 A1 * | 12/2002 | Hobbs .................... G06Q 20/04 705/39 |
| 2005/0077350 A1 | 4/2005 | Courtion et al. |
| 2005/0228750 A1 | 10/2005 | Olliphant et al. |
| 2005/0256806 A1 | 11/2005 | Tien et al. |
| 2007/0078767 A1 * | 4/2007 | Gendelman ................ 705/44 |
| 2007/0136194 A1 | 6/2007 | Sloan |
| 2007/0187492 A1 | 8/2007 | Graves et al. |
| 2007/0226141 A1 | 9/2007 | Phillips et al. |
| 2007/0245022 A1 | 10/2007 | Olliphant et al. |
| 2009/0006203 A1 | 1/2009 | Fordyce, III et al. |
| 2009/0177582 A1 | 7/2009 | Cucinotta |
| 2009/0240594 A1 | 9/2009 | Kerner et al. |
| 2010/0100481 A1 | 4/2010 | Doran et al. |
| 2010/0285818 A1 | 11/2010 | Crawford |
| 2010/0287044 A1 | 11/2010 | Mason |
| 2010/0299194 A1 | 11/2010 | Snyder et al. |
| 2011/0099055 A1 | 4/2011 | Khalil |
| 2011/0196753 A1 * | 8/2011 | Hodgdon et al. ............... 705/16 |

FOREIGN PATENT DOCUMENTS

| | | |
|---|---|---|
| KR | 1020020071144 | 9/2002 |
| WO | 0118720 | 3/2001 |
| WO | 0205231 | 7/2002 |

OTHER PUBLICATIONS

PCT; International Search Report and Written Opinion dated May 31, 2011 in Application No. PCT/US2011/031059.
U.S.; Final Office Action dated Jul. 22, 2011 in U.S. Appl. No. 12/054,164.
PCT; International Search Report dated Nov. 26, 2010 in Application No. PCT/US2009/037965.
PCT; Written Opinion dated Nov. 23, 2010 in Application No. PCT/US2009/037965.
U.S.; Office Action Restriction dated Aug. 31, 2010 in U.S. Appl. No. 12/054,164.
U.S.; Office Action dated Oct. 15, 2010 in U.S. Appl. No. 12/054,164.
CN; Office Action dated Dec. 26, 2011 in Application No. 200980118520.X.
U.S.; Office Action dated Jun. 29, 2012 in U.S. Appl. No. 13/026,013.
PCT; International Preliminary Report on Patentability dated May 14, 2012 in Application No. PCT/US2011/031059.
U.S.; Office Action dated Jun. 13, 2012 in U.S. Appl. No. 13/025,965.
Office Action dated Jun. 27, 2013 in Canadian Application No. 2,719,941.
Final Office Action dated Oct. 23, 2012 in U.S. Appl. No. 13/026,013.
Advisory Action dated Nov. 30, 2012 in U.S. Appl. No. 13/025,965.
Advisory Action dated Jan. 2, 2013 in U.S. Appl. No. 13/026,013.
Office Action dated Jul. 31, 2012 in Chinese Application No. 200980118520.X.
Final Office Action dated Sep. 26, 2012 in U.S. Appl. No. 13/025,965.
Office Action dated Jun. 5, 2014 in U.S. Appl. No. 12/054,164.
Search Report dated Jan. 16, 2013 in European Application No. 09751042.4.
Office Action dated Mar. 5, 2013 in Chinese Application No. 200980118520.X.
Office Action dated Oct. 7, 2014 in U.S. Appl. No. 12/054,164.
Office Action dated Aug. 6, 2014 in U.S. Appl. No. 13/025,965.

(56) References Cited

OTHER PUBLICATIONS

Office Action dated Aug. 22, 2014 in U.S. Appl. No. 13/026,013.
Notice of Allowance dated Aug. 12, 2015 in U.S. Appl. No. 12/054,164.
"Electronic Funds Transfer Association Announces New Groundbreaking Guidelines for Secure, Real-time Debit Transation Purchases over the Internet," Business Editors/Hi-Tech Writers, Business Wire, Mar. 6, 2001, retrieved from Proquest Aug. 6, 2015.
Office Action dated Sep. 1, 2015 in U.S. Appl. No. 13/025,965.
Final Office Action dated Dec. 5, 2014 in U.S. Appl. No. 13/025,965.
Final Office Action dated Dec. 5, 2014 in U.S. Appl. No. 13/026,013.
Advisory Action dated Feb. 20, 2015 in U.S. Appl. No. 13/025,965.
Advisory Action dated Feb. 20, 2015 in U.S. Appl. No. 13/026,013.
Final Office Action dated Apr. 8, 2015 in U.S. Appl. No. 12/054,164.
Advisory Action dated Jul. 7, 2015 in U.S. Appl. No. 12/054,164.
Office Action dated Oct. 13, 2015 in U.S. Appl. No. 13/026,013.
Final Office Action dated Nov. 24, 2015 in U.S. Appl. No. 13/025,965.
Final Office Action dated Feb. 3, 2016 in U.S. Appl. No. 13/026,013.
Advisory Action dated Apr. 5, 2016 in U.S. Appl. No. 13/026,013.
Advisory Action dated Feb. 9, 2016 in U.S. Appl. No. 13/025,965.
Office Action dated Aug. 4, 2016 in U.S. Appl. No. 13/025,965.
Office Action dated Oct. 14, 2016 in U.S. Appl. No. 13/026,013.
Advisory Action dated Apr. 12, 2017 in U.S. Appl. No. 13/026,013.
Final Office Action dated Feb. 28, 2017 in U.S. Appl. No. 13/026,013.
Advisory Action dated Dec. 12, 2016 in U.S. Appl. No. 13/025,965.

* cited by examiner

SECURE EXCHANGE OF INDICIA OF VALUE AND ASSOCIATED INFORMATION

TECHNICAL FIELD

The present disclosure relates, in general, to financial transactions and, more particularly, to secure exchange of indicia of value and associated information.

BACKGROUND

Merchants and financial entities sometimes offer coupons or discounts (collectively, "offers") on various products and services. For smaller companies, marketing such offers can be burdensome. As such, smaller companies may often use third party marketing companies or issuing entities that generally have the ability to reach more customers and administer the offers. Many such offers are based on selling a certain number of offers to consumers. Because these offers are administered by the third party, when presented with such offers by the customers, it is often difficult for the merchant to determine if the offers are valid, how many are out there, or other valuable information that the merchant may need to effectively manage the offers.

BRIEF SUMMARY

Various aspects of the present disclosure are directed to the secure exchange of value and associated information in financial transactions involving beneficial offers available for customers. Various offers, including discounts, prepaid amounts, and the like may be purchased by customers for use with various merchants. A third party issuer obtains information from the customer in selling the offers and issues some kind of indicium of value having a representation of the value of the offer associated therein. Record of the indicium are maintained and either transmitted to the merchants or kept by the issuer or associated financial institution. When the customer redeems the offer by presenting the indicium to the merchant, the merchant may either authenticate the indicium using the records received by the issuer, or establish communication with the issuer for the issuer to authenticate the indicium, either by itself or in cooperation with one or more related financial institutions.

In a first aspect, a method of facilitating a financial transaction includes receiving a request to purchase an offer from a customer, prompting the customer to provide payment information for a value of the offer, processing the payment information to obtain the value in response to receiving the payment information, associating the value of the offer with an indicium of value, issuing the indicium of value to the customer, and transmitting a record of the indicium of value, including identification (ID) information of the indicium of value, to a merchant associated with the offer.

In a second aspect, a computer program product to facilitate a financial transaction includes a computer-readable medium having program code recorded thereon. The program code includes code to receive a request to purchase an offer from a customer, code to prompt the customer to provide payment information for a value of the offer, code, executable in response to receiving the payment information, to process the payment information to obtain the value, code to associate the value of the offer with an indicium of value, code to issue the indicium of value to the customer, and code to transmit a record of the indicium of value, including ID information of the indicium of value, to a merchant associated with the offer.

In a third aspect, a computer system is configured to facilitate a financial transaction. The computer system includes at least one processor, a memory coupled to the processor, and an offer management application stored in the memory. When executed by the processor, the executing offer management application configures the computer system to receive a request to purchase an offer from a customer, to prompt the customer to provide payment information for a value of the offer, to process the payment information to obtain the value in response to receiving the payment information, to associate the value of the offer with an indicium of value, to issue the indicium of value to the customer, and to transmit a record of the indicium of value, including ID information of the indicium of value, to a merchant associated with the offer.

In a fourth aspect, a method of facilitating a financial transaction includes receiving an indicium of value from a customer during a financial transaction, comparing ID information associated with the indicium of value against a record of valid indicia of value, the record received from an issuer of the indicium of value, reading a value represented in the indicium of value in response to the ID information matching one of the valid indicia of value of the record, and applying the value to the financial transaction.

In a fifth aspect, a computer program product to facilitate a financial transaction includes a computer-readable medium having program code recorded thereon. The program code includes code to receive an indicium of value from a customer during a financial transaction and code to compare ID information associated with the indicium of value against a record of valid indicia of value, where the record received from an issuer of the indicium of value. The program code also includes code, executable in response to the ID information matching one of the valid indicia of value of the record, to read a value represented in the indicium of value and code to apply the value to the financial transaction.

In a sixth aspect, a computer system is configured to facilitate a financial transaction. The computer system includes at least one processor, a memory coupled to the processor, and an offer management application stored in the memory. When executed by the processor, the executing offer management application configures the computer system to receive an indicium of value from a customer during a financial transaction, to compare ID information associated with the indicium of value against a record of valid indicia of value, the record received from an issuer of the indicium of value, to read a value represented in the indicium of value in response to the ID information matching one of the valid indicia of value of the record, and to apply the value to the financial transaction.

In a seventh aspect, a method of facilitating a financial transaction includes receiving an indicium of value from a customer during a financial transaction, transmitting ID information associated with the indicium of value to a third party processor for authentication, receiving an authentication from the third party processor authorizing the indicium of value to an authorized amount, and applying the authorized amount to the financial transaction.

In an eighth aspect, a computer program product to facilitate a financial transaction includes a computer-readable medium having program code recorded thereon. The program code include code to receiving an indicium of value from a customer during a financial transaction, code to transmit ID information associated with the indicium of value to a third party processor for authentication, code to receive an authentication from the third party processor authorizing the indicium of value to an authorized amount, and code to apply the authorized amount to the financial transaction.

In a ninth aspect, a computer system is configured to facilitate a financial transaction. The computer system includes at least one processor, a memory coupled to the at least one processor, and an offer management application stored in the memory. When executed by the processor, the executing offer management application configures the computer system to receiving an indicium of value from a customer during a financial transaction, to transmit ID information associated with the indicium of value to a third party processor for authentication, to receive an authentication from the third party processor authorizing the indicium of value to an authorized amount, and to apply the authorized amount to the financial transaction.

BRIEF DESCRIPTION OF THE DRAWINGS

For a more complete understanding of the present teachings, reference is now made to the following description taken in conjunction with the accompanying drawings.

DETAILED DESCRIPTION

Figure 1:
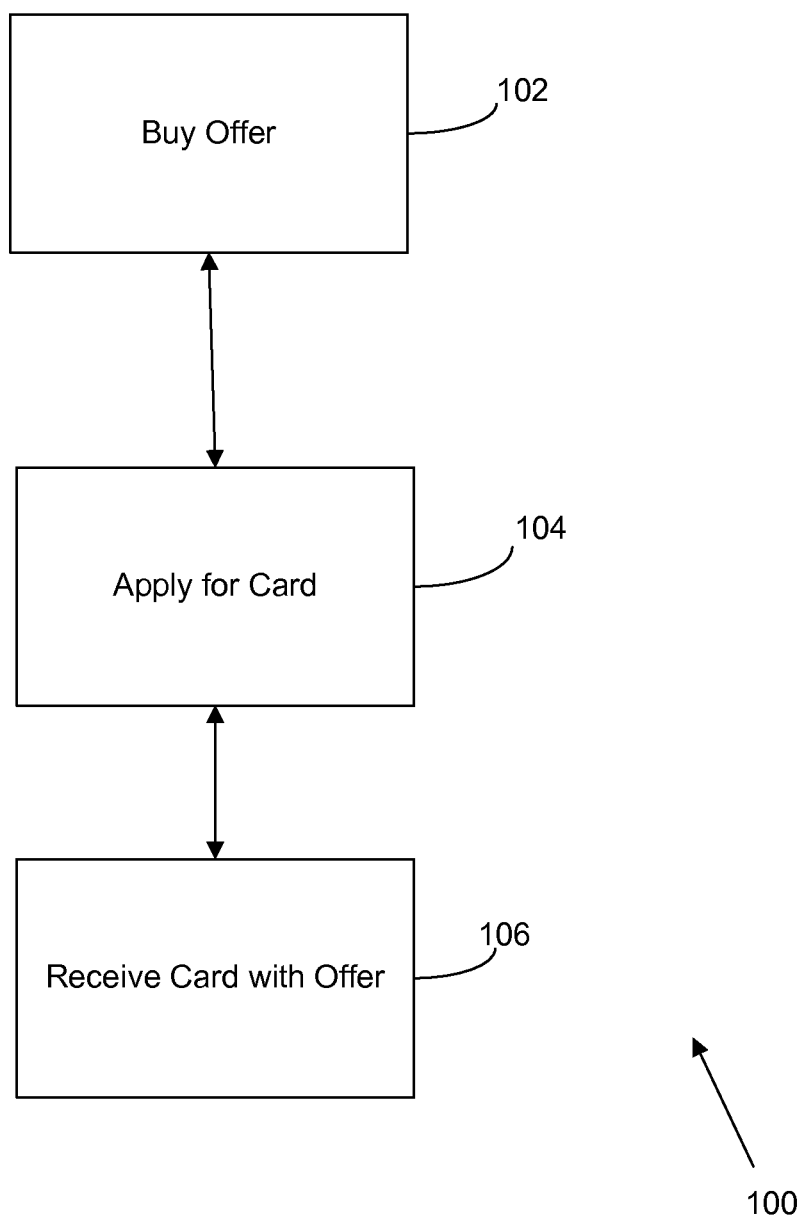
FIG. 1 is a schematic representation of a system for financial transactions, according to an example embodiment of the present disclosure.

In the detailed description below, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter. Some portions of the detailed description may be presented in terms of algorithms or symbolic representations of operations on data bits or binary digital signals stored within a computing system memory, such as a computer memory. These algorithmic descriptions or representations are examples of techniques used by those of ordinary skill in the art to convey the substance of their work to others skilled in the art.

An algorithm is here, and generally, considered to be a self-consistent sequence of operations or similar processing leading to a desired result. In this context, operations or processing involve physical manipulation of physical quantities. Typically, although not necessarily, such physical quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like, refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

In general, the various aspects and embodiments of the present disclosure are related to delivering or exchanging indicia of value that represent consumer offers, such as coupons, discounts, or the like, between a third party and a consumer. In particular, a third party may sell such consumer offers to consumers and deliver the indicium of value to the consumer to represent such purchased offer. In the purchasing process, the third party also collects information from the consumer. The third party often partners with a financial entity and shares information related to the consumer and the particular consumer offer sold. In representative aspects of the present disclosure, in response to the third party delivering the information, the financial entity may issue an indicium of value to the consumer, such as a stored value card, a representative code, such as a numeric, optical, magnetic code, or the like, associated with the value of the consumer offer, or any other type of indicia that represents the value of the consumer offer stored on, embedded into, or encoded in the indicium of value. The indicium of value issued by the financial entity may also include some associated information stored on, embedded into, or encoded in the indicium as well. With the value of the consumer offer and at least some of the associated information found with the indicium of value, fraud may be reduced as the information stored on the indicium may be verified in near real-time by the financial entity prior to approval by the merchant.

Additionally, the financial entity and third party may partner to share information and offer multiple products to a consumer during a single transaction. For example, when a consumer decides to buy an offer, the consumer may also apply for a stored value card, credit card, or the like, with the same information gathered for purchasing the offer. The third party shares the information with the financial institution that would issue such card. As such, the issuance of the indicium of value would include the purchased consumer offer and an approval to have the stored value card or credit card issued by the financial institution, as well as ID information related to the indicium that would allow a merchant to identify the particular indicium to an authenticating entity.

Referring now to FIG. 1, a schematic representation of a financial transaction system 100 is provided. The financial transaction system 100 includes a consumer buying an offer 102. In buying the offer 102, the consumer provides information, such as name, address, date of birth, and the like, to an offer issuer. The offer issuer then shares that information with a financial entity which uses it to fill in a credit application with the financial entity. Thus, in purchasing the offer 102, the consumer is also applying for additional value 104 from a financial institution. Such additional value may be a stored value card, a credit card account, or the like. When the financial institution issues the indicium of value 106, which may be a card or some kind of code, it will include representations of both the purchased offer 102 and the additional value 104. As the consumer uses the indicium of value 106 to redeem the offer 102, the consumer would also be able to use the indicium of value for the additional value 104 for anything else as well.

Figure 2:
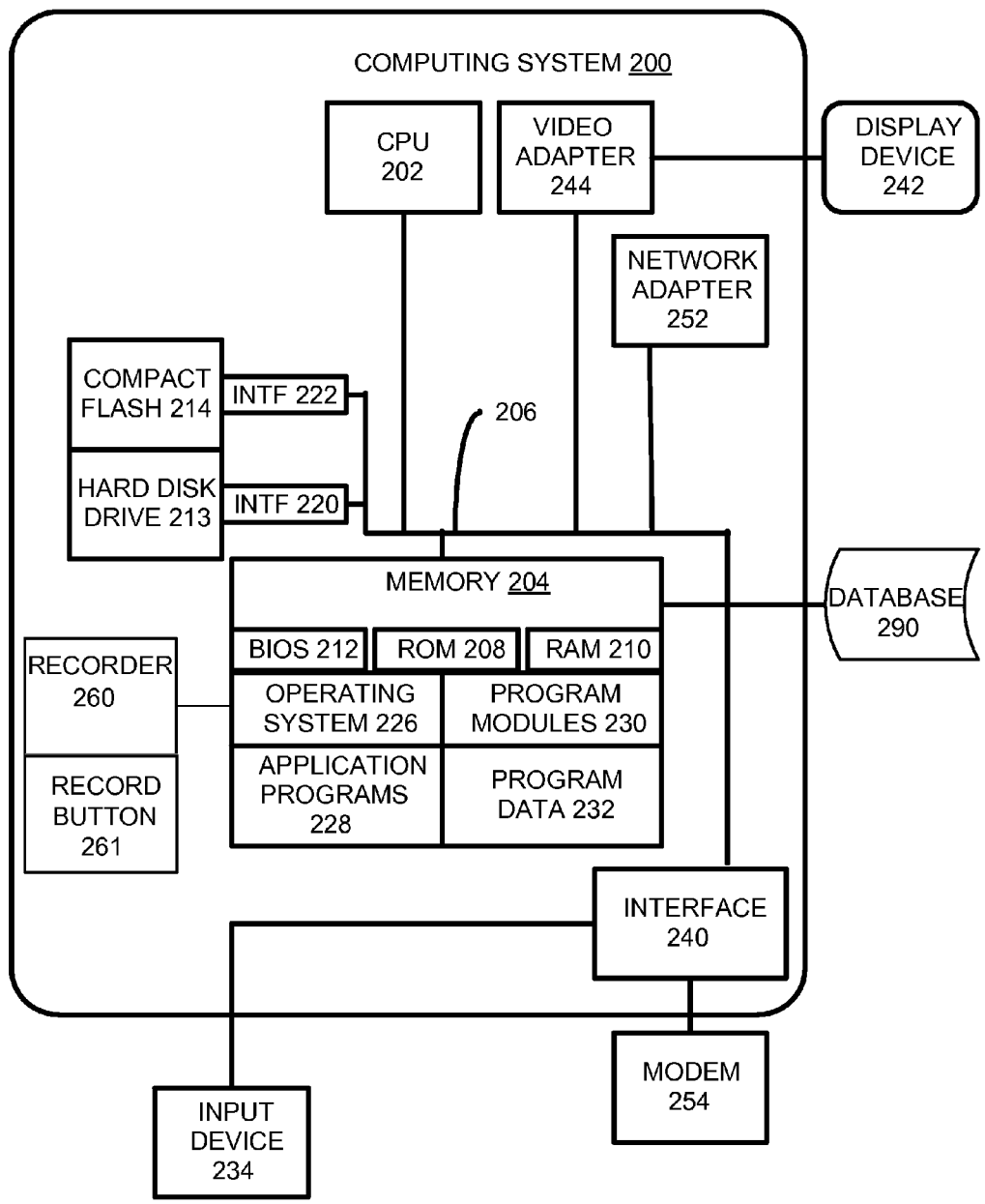
FIG. 2 is a schematic representation of a computing system that can be used to implement aspects of the present disclosure.

Referring now to FIG. 2, an exemplary environment for implementing embodiments of the present invention includes a general purpose computing device in the form of a computing system 200, including at least one processing system 202. A variety of processing units are available from a variety of manufacturers, for example, Intel or Advanced Micro Devices. The computing system 200 also includes a system memory 204, and a system bus 206 that couples various system components including the system memory 204 to the processing unit 202. The system bus 206 may be any of a number of types of bus structures including a memory bus, or memory controller; a peripheral bus; and a local bus using any of a variety of bus architectures.

The system memory 204 includes read only memory (ROM) 208 and random access memory (RAM) 210. A basic input/output system 212 (BIOS), containing the basic routines that help transfer information between elements within the computing system 200, such as during start up, is typically stored in the ROM 208.

The computing system 200 further includes a secondary storage device 213, such as a hard disk drive, for reading from and writing to a hard disk (not shown), and/or a compact flash card 214.

The hard disk drive 213 and compact flash card 214 are connected to the system bus 206 by a hard disk drive interface 220 and a compact flash card interface 222, respectively. The drives and cards and their associated computer readable media provide nonvolatile storage of computer readable instructions, data structures, program modules and other data for the computing system 200.

Although the exemplary environment described herein employs a hard disk drive 213 and a compact flash card 214, it should be appreciated by those skilled in the art that other types of computer-readable media, capable of storing data, can be used in the exemplary system. Examples of these other types of computer-readable mediums include magnetic cassettes, flash memory cards, digital video disks, Bernoulli cartridges, CD ROMS, DVD ROMS, random access memories (RAMs), read only memories (ROMs), and the like.

A number of program modules may be stored on the hard disk 213, compact flash card 214, ROM 208, or RAM 210, including an operating system 226, one or more application programs 228, other program modules 230, and program data 232. A user may enter commands and information into the computing system 200 through an input device 234. Examples of input devices might include a keyboard, mouse, microphone, joystick, game pad, satellite dish, scanner, digital camera, touch screen, and a telephone. These and other input devices are often connected to the processing unit 202 through an interface 240 that is coupled to the system bus 206. These input devices also might be connected by any number of interfaces, such as a parallel port, serial port, game port, or a universal serial bus (USB). A display device 242, such as a monitor or touch screen LCD panel, is also connected to the system bus 206 via an interface, such as a video adapter 244. The display device 242 might be internal or external. In addition to the display device 242, computing systems, in general, typically include other peripheral devices (not shown), such as speakers, printers, and palm devices.

When used in a LAN networking environment, the computing system 200 is connected to the local network through a network interface or adapter 252. When used in a WAN networking environment, such as the Internet, the computing system 200 typically includes a modem 254 or other means, such as a direct connection, for establishing communications over the wide area network. The modem 254, which can be internal or external, is connected to the system bus 206 via the interface 240. In a networked environment, program modules depicted relative to the computing system 200, or portions thereof, may be stored in a remote memory storage device. It will be appreciated that the network connections shown are exemplary and other means of establishing a communication link between the computing systems may be used.

The computing system 200 might also include a recorder 260 connected to the memory 204. The recorder 260 includes a microphone for receiving sound input and is in communication with the memory 204 for buffering and storing the sound input. Preferably, the recorder 260 also includes a record button 261 for activating the microphone and communicating the sound input to the memory 204.

A computing device, such as computing system 200, typically includes at least some form of computer-readable media. Computer readable media can be any available media that is accessible by the computing system 200. By way of example, and not limitation, computer-readable media might comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that can be used to store the desired information and that can be accessed by the computing system 200.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media. Computer-readable media may also be referred to as computer program product.

The computing system 200 may be used to implement the processes defining the various embodiments of the present disclosure, including the flow and functional block processes as defined in FIGS. 3, 4, and 9-11, as well as any of the other processes and procedures described in implementing the various aspects of the present disclosure.

Figure 3:
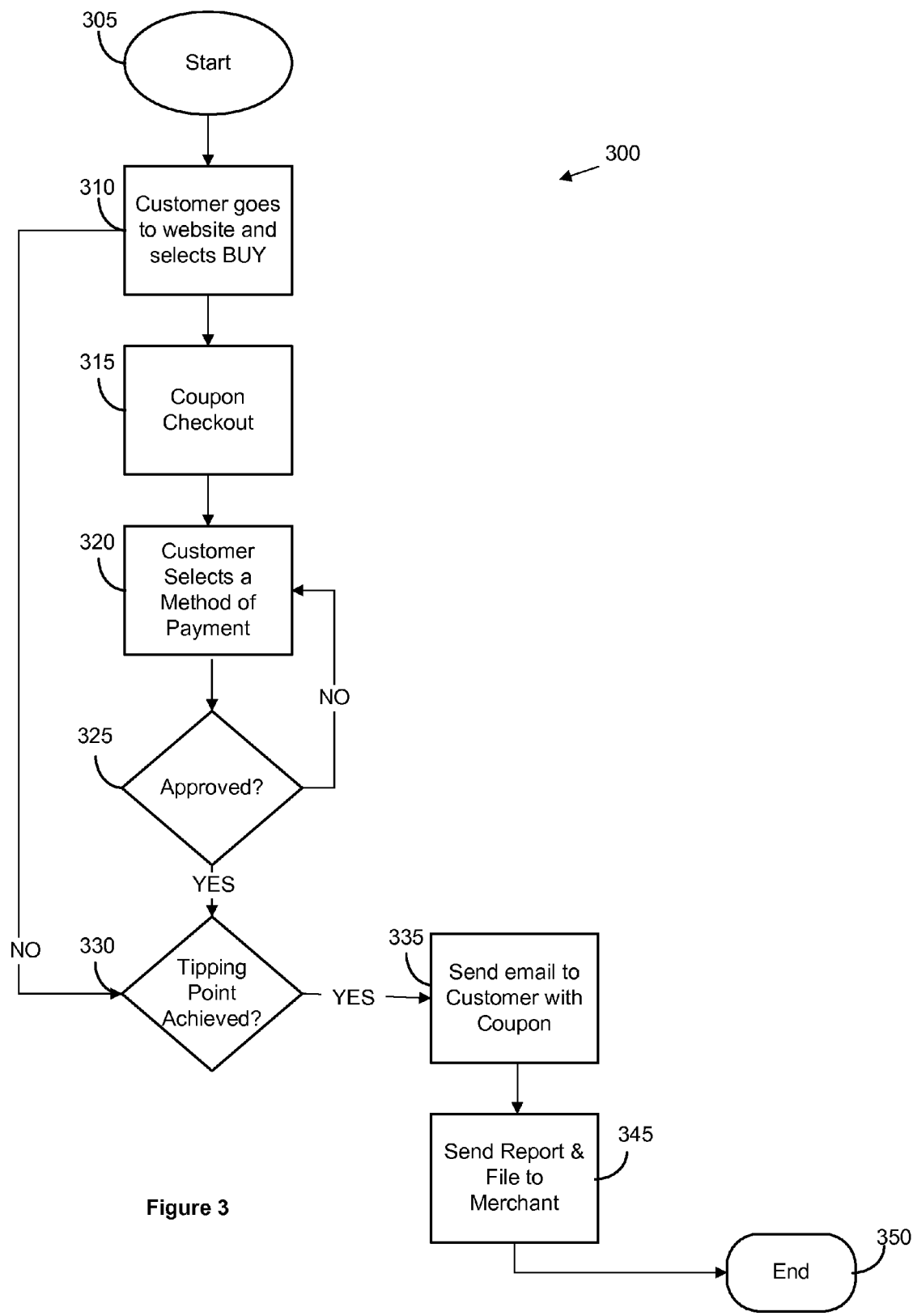
FIG. 3 is an operational flow diagram of a method and system for financial transactions, according to an example embodiment of the present disclosure.

Referring now to FIG. 3, a flow diagram of a purchase transaction system 300 is illustrated. Preferably, the purchase transaction system 300 is instantiated by a start operation 305. Operational flow proceeds to a buy operation 310. For example, a third party website may offer to visitors of the website the ability to buy coupons for merchant. One such merchant may include Erik's steak house. Erik's steak house may wish to offer a $200 meal for $100. In other words, the user buys the $200 gift card to Erik's steak house for only $100. The buy operation 310 receives a request from a user to buy a coupon, or a gift card. In the above example, the user requests to buy the $200 gift card for the $100.

A checkout operation 315 checks out the user as is well known. A payment operation 320 receives a request from the user as to the method of payment, i.e. a credit or debit card. An approval operation 325 determines if the payment has been approved. If the approval operation 325 determines that the payment has not been approved, then operational flow branches "NO" to the payment operation 320 for the user to select a different method of payment. If the approval operation 325 determines that the payment has been approved, the operational flow branches "YES" to a tipping operation 330.

The tipping operation 330 determines if a tipping point has been achieved. A merchant, i.e. Erik's steak house, may only be interested in issuing such coupons or gift cards if a certain number of them are sold (the tipping point). In the example user, Erik's steak house is only interested in selling if 100 gift cards are sold. Thus, the tipping operation 330 determines if the 100 gift card threshold has been achieved. If the tipping operation 330 determines that the tipping point has not been achieved, i.e. not 100 gift cards, then operational flow branches "NO" to the buy operation 310. If the tipping operation 330 determines that the tipping point has been achieved, i.e. 100 gift cards, then operational flow branches "YES" to a send operation 335.

The send operation 335 sends an email to each customer including the customer's coupon. A report operation 345 sends a report and file to the merchant. Such report and file can include how many coupons were issued, who they were issued to, and include financial information.

Figure 4:
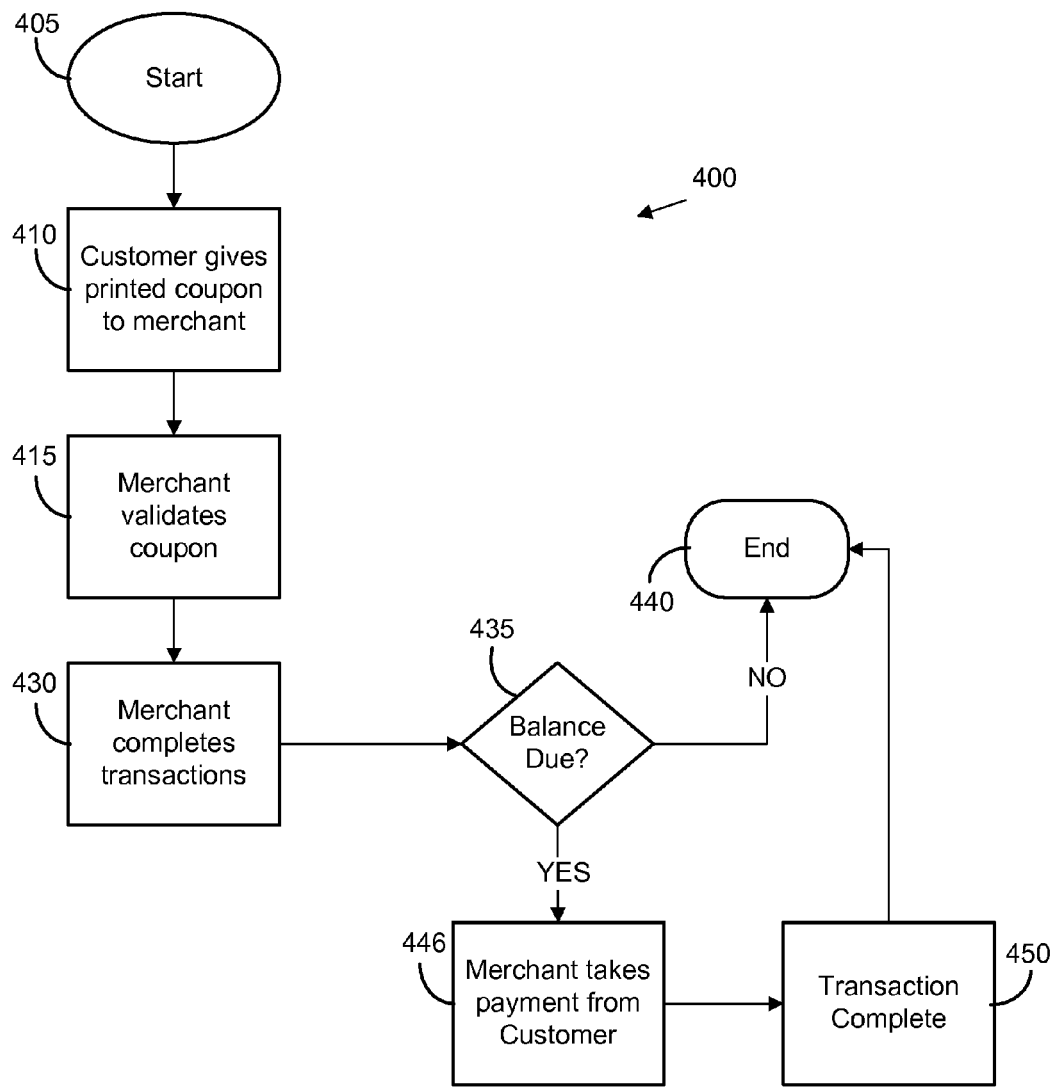
FIG. 4 is an operational flow diagram of a method and system for financial transactions, according to an example embodiment of the present disclosure.

FIG. 4 is a flow diagram of a redemption transaction system 400. Preferably, the redemption transaction system 400 is instantiated by a start operation 405. Operational flow proceeds to a redemption operation 410. At the redemption operation 410, the customer redeems the coupon. A validate operation 415 validates the coupon to ensure its validity. For example, the validate operation 415 can looked at the printed report or a spreadsheet to make sure that corresponding numbers on the coupon and the report match. Once validated, a completion operation 430 completes the transaction using the coupon. A balance operation 435 determines if any balance is remaining. If the balance operation 435 determines that no balance is due, operational flow branches "NO" to an end operation 440. If the balance operation 435 determines that a balance is due, operational flow branches "YES" to a payment operation 445. The payment operation 445 collects any remaining balance due.

Using the above example, the customer is at Erik's steak house with their $200 coupon. The customer spends $275. The completion operation 430 uses the coupon to reduce to the balance to $75. The balance operation 435 determines that a balance is due and the payment operation 445 receives payment from the customer for the $75. A transaction operation 450 completes the transaction. Operational flow ends at the end operation 440.

Figure 5:
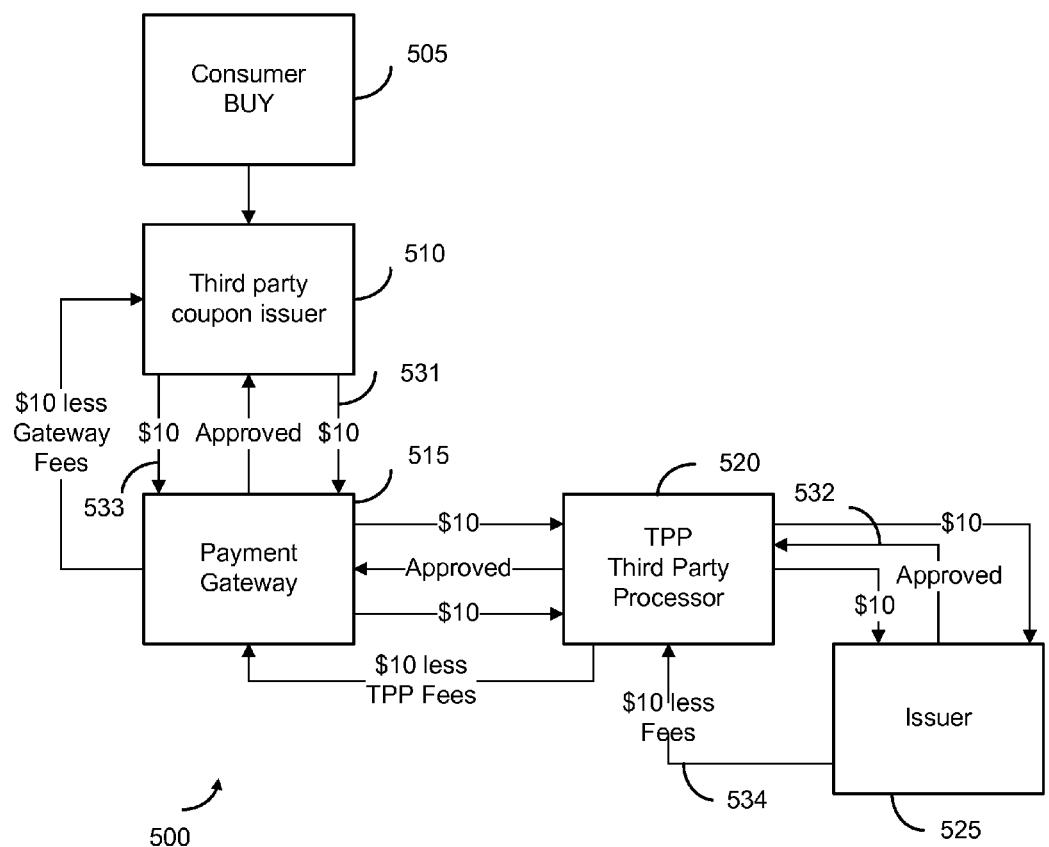
FIG. 5 is a schematic representation of a consumer buying an offer, according to an example embodiment of the present disclosure.

FIG. 5 is a block diagram of a purchase transaction system 500. Preferably, the purchase transaction system 500 includes a consumer 505, a third party coupon issuer 510, a payment gateway 515, a third party processor 520, and an issuer 525. The consumer 505 goes to the coupon issuer 510 to purchase a $20 coupon for $10. The coupon issuer 510 sends an authorization request 531 for the $10 to the payment gateway 515. The payment gateway 515 sends the authorization request 531 to the third party processor 520, who in turns sends it 531 to the issuer 525 for approval.

The issuer 525 sends an approval 532 to the third party processor 520, who sends it to the payment gateway 515, who sends the approval to the coupon issuer 510. The coupon issuer then sends a settlement 533 to the payment gateway 515 on through to the issuer 525. The issuer 525 then sends the funding, i.e. $10, 534 to the third party processor 520 minus fees. The third party processor 520 then sends the remaining funding, minus its fees to the payment gateway 515. The payment gateway 515 then sends the remaining funding, minus its fees to the coupon issuer 510.

Figure 6:
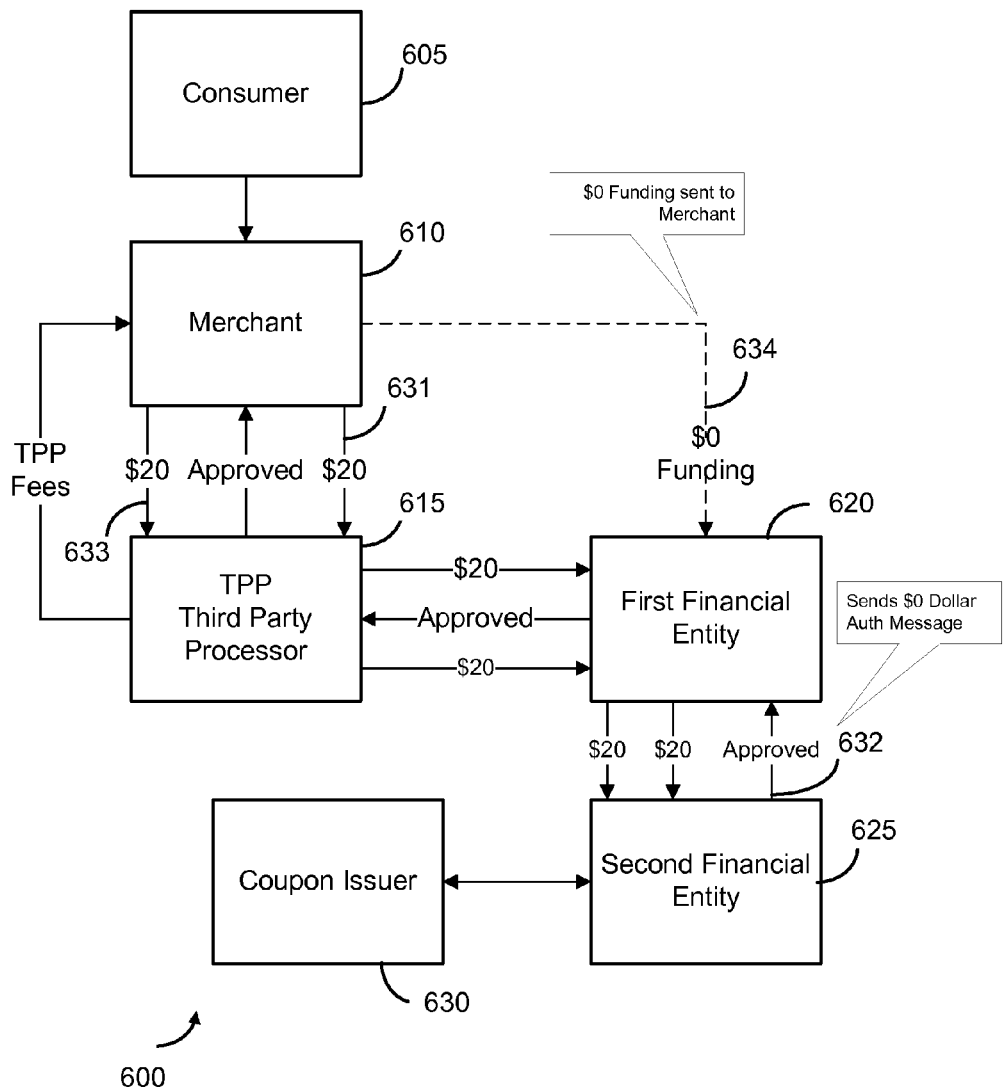
FIG. 6 is a schematic representation of a consumer redeeming an offer, according to an example embodiment of the present disclosure.

FIG. 6 is a block diagram of a redemption transaction system 600. Preferably, the transaction system 600 includes a consumer 605, a merchant 610, a third party processor 615, a first financial entity 620, a second financial entity 625, and a coupon issuer 630. The consumer 605 goes to the merchant 610 to redeem its coupon, i.e. the $20 coupon purchase in connection with FIG. 5 for $10. The merchant 610 sends an authorization request 631 for the coupon of $20 to the third party processor 615. The third party processor 615 sends the authorization request 631 to a first financial entity 620. The first financial entity 620 sends the authorization request 631 to the second financial entity 625 for approval. The second financial entity 625 sends an approval 632 back to the first financial entity 620, who passes the approval 632 to the third party processor 615, who passes the approval 632 to the merchant 610.

The merchant 610 sends the settlement 633 for $20 to the third party processor 615 who processes the settlement. The third party 615 processor sends the settlement 633 to the first financial entity 620. The first financial entity 620 sends the settlement to the second financial entity 625. Unlike, FIG. 5, funding 634 is not provided because no money is changing hands. The $10 was collected in connection with FIG. 5. FIG. 6 is mainly an authorization/validation of the $20 coupon. Thus, the merchant knows that the coupon is valid and after use is empty or invalid. The third party processor 615 does charge a transaction fee to the merchant 610. A merchant statement would show a sales transaction of $20 along with a coupon credit of $20 for a balance owed the merchant of $0.

The transaction could also be for more than the $20 coupon. For example, the consumer might spend $30 at the merchant. The consumer 605 would present its coupon to the merchant 610 for $20. The merchant 610 would send a request to the third party processor for $30 ($10 plus the $20 coupon), which would be passed through to the second financial entity 625. The second financial entity could decline or approve the extra $10 and the money could be funded to the merchant 610 through a funding 634 that would be $10 instead of $0. For example, the coupon might be part of a stored value card or charge card. Thus, the extra $10 could be deducted from the stored value or charged to the customer's 605 account.

The transactions illustrated in FIGS. 5 and 6 are advantageous because the merchant has the ability to validate the coupon before allowing the customer the credit. Likewise, each entity involves has up-to-date information about the coupon and the transaction. That information can be passed to the coupon issuer 630 for its own purposes.

Referring to FIGS. 5 and 6, when the consumer 505 buys the coupon from the third party coupon issuer 510, the consumer provides certain information for purchase of the coupon. The third party coupon issuer 510/630 can share that information with the second financial entity 625 in order to apply the consumer for an account with the second financial entity 625. If approved, the purchase of the offer by the consumer 505 will result in the consumer getting the coupon and opening an account with the second financial entity 625. The coupon can then be stored on the new card issued by the second financial entity 625 and sent to the consumer for use.

When the consumer uses the card to use the coupon, the card can also be used to fund the balance of the transaction over the coupon value either through some sort of stored value, debit arrangement or credit arrangement. During further transactions, information can also be shared between the coupon issuer 630 and the second financial entity 625. Such information could include when the consumer used the coupon, what was the total price, what type of merchandise or service was purchased, etc. Such information could be valuable the coupon issuer 630 in future decisions. The sharing is also valuable to the financial entity 625 in that new customers are enrolled for use of the financial entities cards from which fees are generated.

Figure 7:
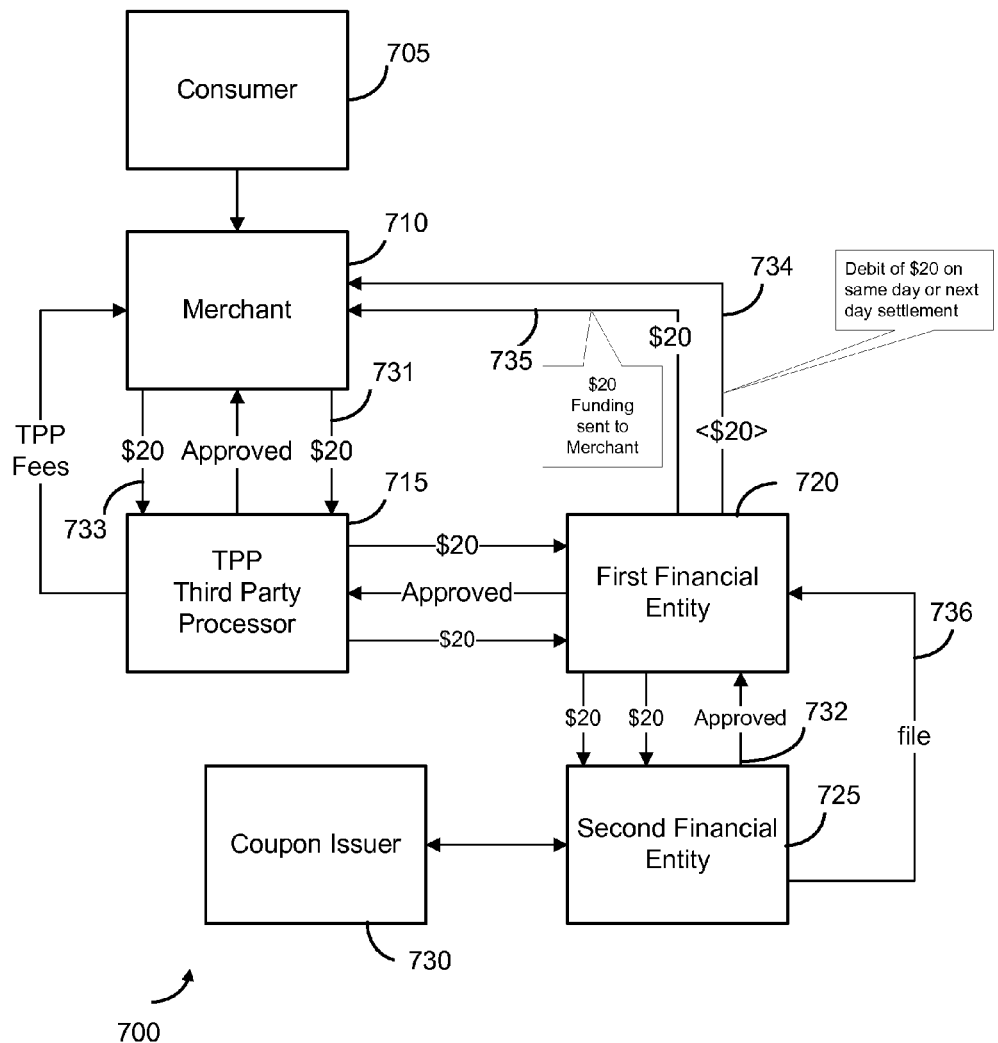
FIG. 7 is a schematic representation of a consumer redeeming an offer, according to an example embodiment of the present disclosure.

FIG. 7 is a block diagram of a purchase transaction system 700, according to another example embodiment. Preferably, the transaction system 700 includes a consumer 705, a merchant 710, a third party processor 715, a first financial entity 720, a second financial entity 725, and a coupon issuer 730. The consumer 705 goes to the merchant 710 to redeem its coupon, i.e. the $20 coupon purchase in connection with FIG. 5 for $10. The merchant 710 sends an authorization request 731 for the coupon of $20 to the third party processor 715. The third party processor 715 sends the authorization request 731 to a first financial entity 720. The first financial entity 720 sends the authorization request 731 to the second financial entity 725 for approval. The second financial entity 725 sends an approval 732 back to the first financial entity 720, who passes the approval 732 to the third party processor 715, who passes the approval 732 to the merchant 710.

The merchant 710 sends the settlement 733 for $20 to the third party processor 715 who processes the settlement. The third party 715 processor sends the settlement 733 to the first financial entity 720. The first financial entity 720 sends the settlement to the second financial entity 725. In addition, a reconciliation file 736 is sent from the second financial entity 725 to the first financial entity 720. The reconciliation file 736, 734 can also be sent to the merchant 710 showing the details of the transaction. Like FIG. 6, the merchant knows that the coupon is valid and after use is empty or invalid. The third party processor 715 does charge a transaction fee to the merchant 710. A merchant statement would show a sales transaction of $20 along with a coupon credit of $20 for a balance owed the merchant of $0.

Figure 8:
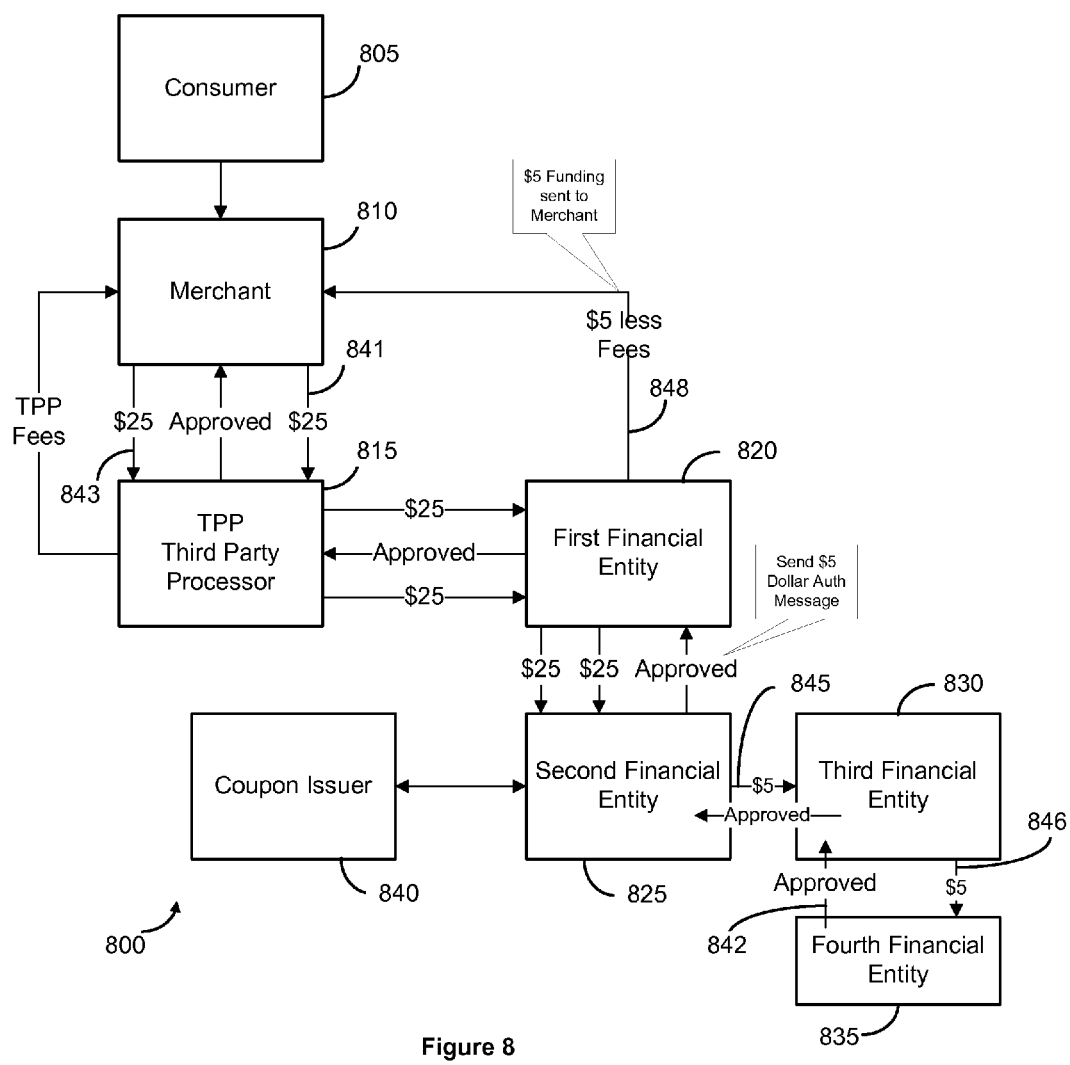
FIG. 8 is a schematic representation of a consumer redeeming an offer, according to an example embodiment of the present disclosure.

FIG. 8 is a block diagram of a purchase transaction system 800, according to another example embodiment. Preferably, the transaction system 800 includes a consumer 805, a merchant 810, a third party processor 815, a first financial entity 820, a second financial entity 825, a third financial entity 830, a fourth financial entity 835, and a coupon issuer 840. The transaction occurs a in FIG. 7, but with further authentication communication occurring with the fourth financial entity 835.

Figure 9:
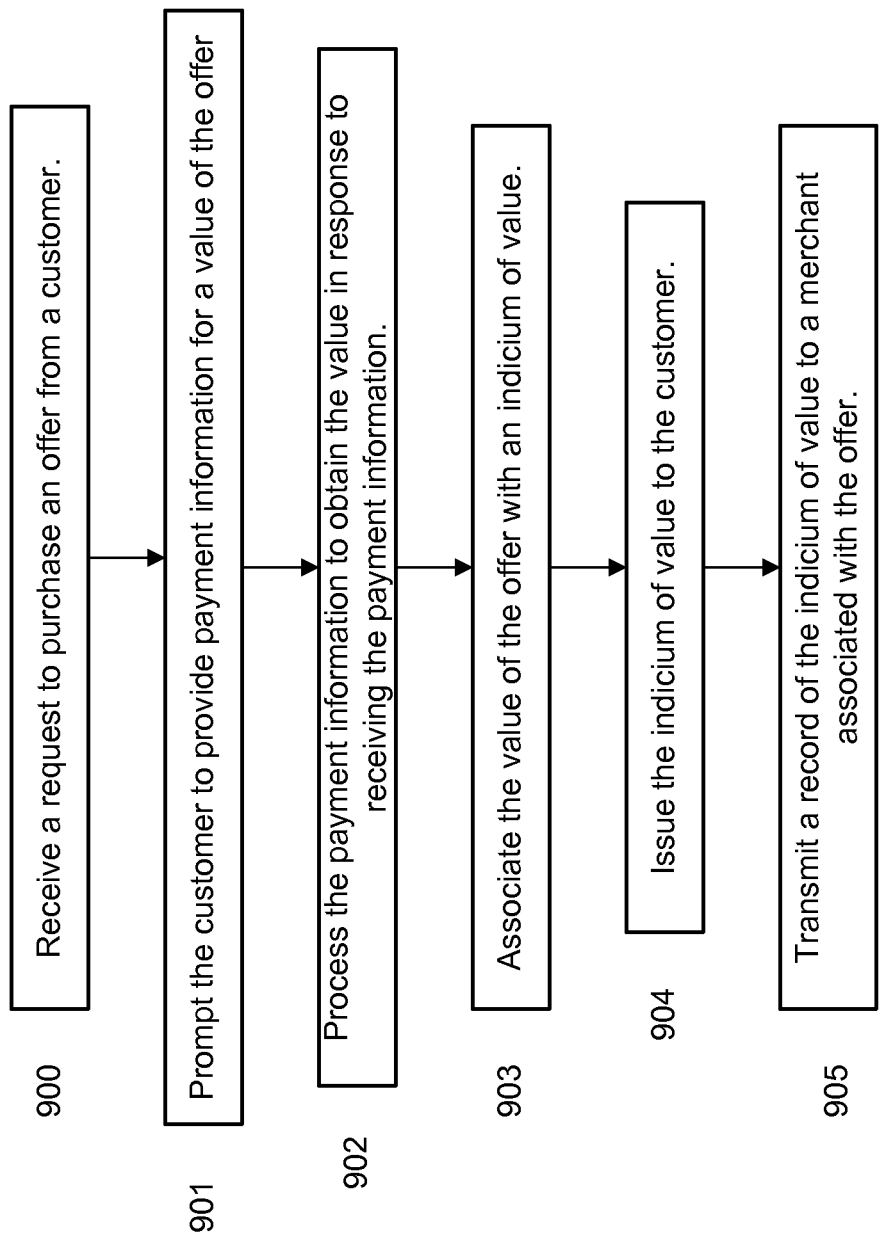
FIG. 9 is a functional block diagram illustrating example blocks executed to implement one embodiment of the present disclosure.

FIG. 9 is a functional block diagram illustrating example blocks executed to implement one embodiment of the present disclosure. In block 900, a request to purchase an offer is received from a customer. The customer is prompted, in block 901, to provide payment information for a value of the offer. The payment information is processed to obtain the value, in block 902, in response to receiving the payment information. The value of the offer is associated with an indicium of value in block 903. An indicium of value may take various forms, including a card, a chip (e.g., a casino chip), an email, a facsimile, a text message, an audio file, a video file, or the like. In block 904, the indicium of value is issued to the customer, while a record of the indicium of value, including ID information for the indicium, is transmitted to a merchant associated with the offer in block 905.

In associating the value of the offer with the indicium of value, some kind of representation is provided for the indicium. For example, the association may be a code or number that is encoded into or on the indicium, for instance, magnetically encoding a magnetic strip, optically encoding by displaying/printing an optical code, such as a barcode, Denso Wave Incorporated's QR CODE™, and the like, displaying the serial number or value in alphanumeric characters on the indicium, or the like. When redeeming the offer by presenting the indicium of value, to a merchant, the merchant uses the associated value and any ID information for the indicium during the authentication process.

Figure 10:
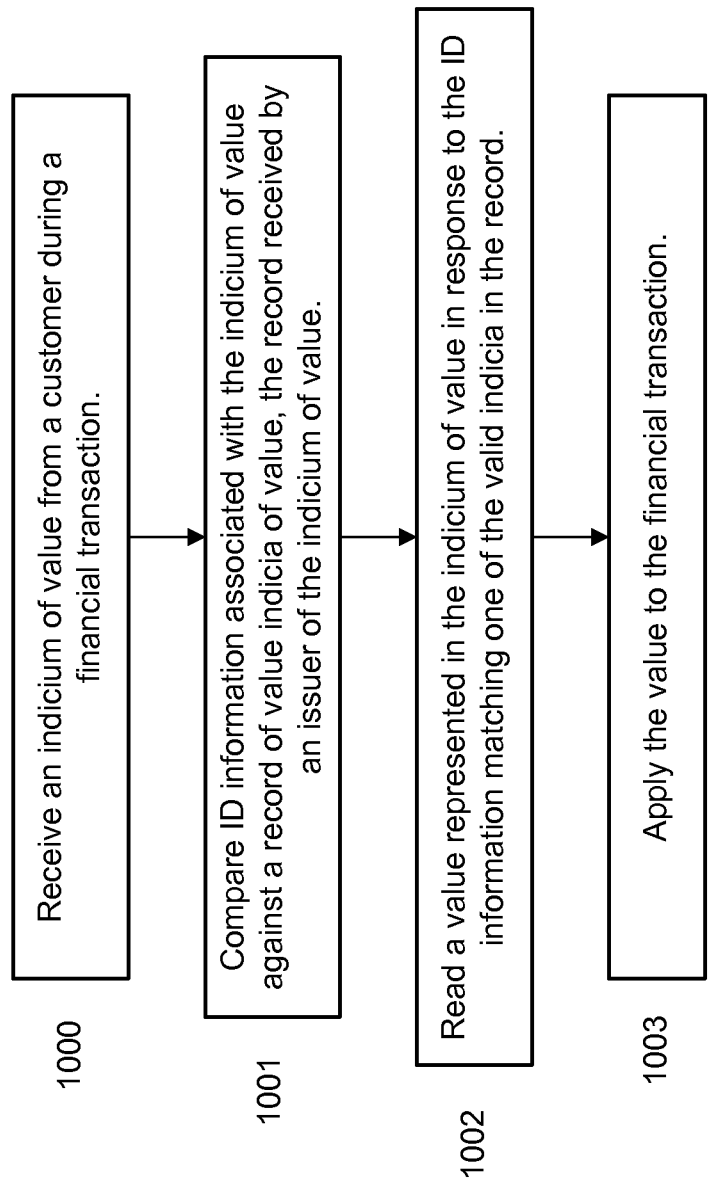
FIG. 10 is a functional block diagram illustrating example blocks executed to implement one embodiment of the present disclosure.

FIG. 10 is a functional block diagram illustrating example blocks executed to implement one embodiment of the present disclosure. In block 1000, an indicium of value is received from a customer during a financial transaction. ID information associated with the indicium of value is then compared against a record of value indicia of value, in block 1001, the record received by an issuer of the indicium of value. A value represented in the indicium of value is read, in block 1002, in response to the ID information matching one of the valid indicia in the record. The value is then applied to the financial transaction in block 1003.

In additional and/or alternative embodiments of the present disclosure, instead of receiving a record of value indicia of value from the issuer, against which the presented indicium are checked, a communication process is established between the merchant and a third party processing entity, which authenticates and then provides an authentication signal to the merchant during the transaction.

Figure 11:
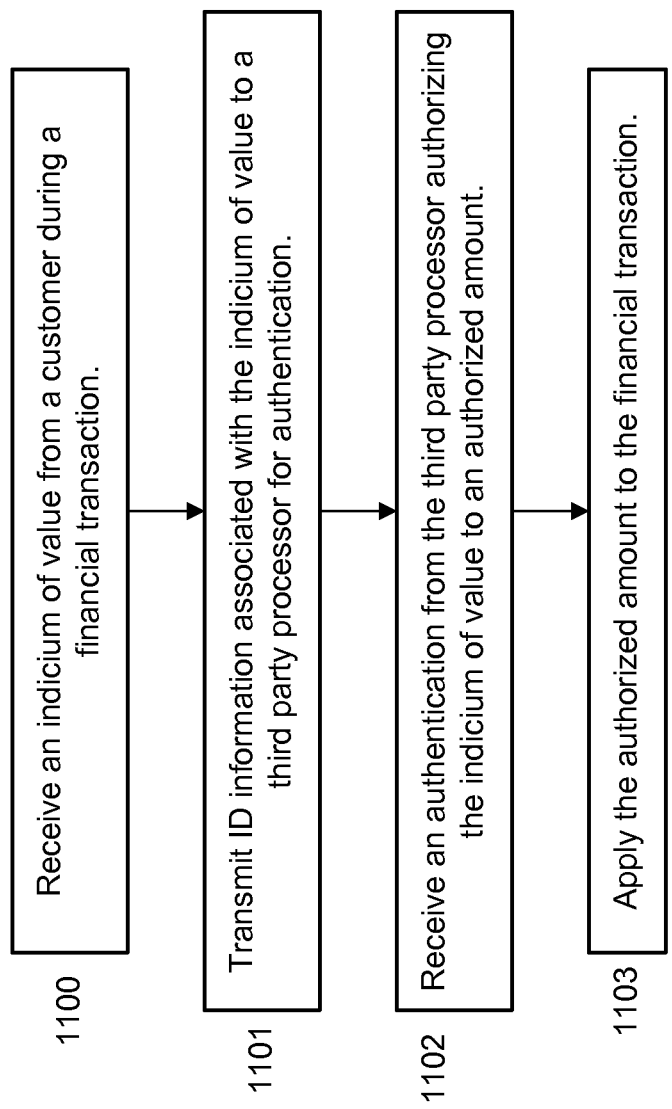
FIG. 11 is a functional block diagram illustrating example blocks executed to implement one embodiment of the present disclosure.

FIG. 11 is a functional block diagram illustrating example blocks executed to implement one embodiment of the present disclosure. In block 1100, an indicium of value is received from a customer during a financial transaction. ID information associated with the indicium of value is transferred, in block 1101, to a third party processor for authentication. An authentication is received from the third party processor, in block 1102, authorizing the indicium of value to an authorized amount. In block 1103, the authorized amount is applied to the financial transaction.

It should be noted that in various aspects of the present disclosure, the third party processor may authenticate the indicium itself, or may communicate with one or more financial institution to obtain authentication and any related authentication information, such as the amount of the indicium of value and the like.

Moreover, in still further aspects of the present disclosure, where additional value has been granted to the customer by virtue of the application completed at the purchase of the offer, any transactions that cost more than the value of the offer associated on the indicium of value may be satisfied by this additional value. In authenticating the indicium, the third party processor may negotiate or communicate with the various associated financial institutions to access the approved additional value for the cost amount over the offer value. In the authentication signal communicated to the merchant, the third party processor would include not only the verification of the indicium for a certain amount, but would also communicate an appropriate signal representing the additional amount approved by the associated financial institution. In this manner, the merchant can complete the transaction.

Aspects of the invention described as being carried out by a computing system or are otherwise described as a method of control or manipulation of data may be implemented in one or a combination of hardware, firmware, and software. Embodiments of the invention may also be implemented as instructions stored on a machine-readable medium, which may be read and executed by at least one processor to perform the operations described herein. A machine-readable medium may include any mechanism for storing or transmitting information in a form readable by a machine (e.g., a computer). For example, a machine-readable medium may include read-only memory (ROM), random-access memory (RAM), magnetic disc storage media, optical storage media, flash-memory devices, electrical, optical, acoustical or other form of propagated signals (e.g., carrier waves, infrared signals, digital signals, etc.), and others.

In the foregoing detailed description, various features are occasionally grouped together in a single embodiment for the purpose of streamlining the disclosure. This method of disclosure is not to be interpreted as reflecting an intention that the claimed embodiments of the subject matter require more features than are expressly recited in each claim. Rather, as the following claims reflect, inventive subject matter lies in less than all features of a single disclosed embodiment. Thus, the following claims are hereby incorporated into the detailed description, with each claim standing on its own as a separate preferred embodiment. Therefore, the spirit and scope of the appended claims should not be limited to the description of the preferred versions contained herein.

Although the present teachings and their advantages have been described in detail, it should be understood that various changes, substitutions and alterations can be made herein without departing from the technology of the teachings as defined by the appended claims. Moreover, the scope of the present application is not intended to be limited to the particular aspects of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding aspects described herein may be utilized according to the present teachings. Accordingly, the appended claims are intended to include within their scope such processes, machines, manufacture, compositions of matter, means, methods, or steps.

What is claimed is:

1. A method comprising:
    receiving, by a third-party processor computer using an offer management application and from a website associated with a merchant system of a merchant, computer code in a data packet that represents a purchase request to purchase an indicium of value for use at said merchant system,
    wherein said indicium of value is issued to said customer, in response to said financial transaction computer checking with said merchant system to determine that a tipping point of a predetermined number of said indicia of value were issued,
    wherein said data packet that represents said purchase request comprises identification (ID) information including data fields which identify said merchant, an authorized amount, consumer name, consumer address and consumer date of birth;
    receiving, by said computer using said offer management application, an account request for a financial account, wherein said account request includes said ID information;
    determining, by said computer using said offer management application, that a number of said indicium of value is below a predetermined threshold;
    associating, by said computer using said offer management application and by flagging data in a database, said indicium of value with said identification (ID) information,
    including, by said computer using said offer management application, said ID information in an application for said financial account;
    sending, by said computer using said offer management application, a data packet including a request for approval of said application for said financial account;
    wherein said financial account is provided to said consumer,
    sending, by said computer using said offer management application, said indicium of value in an email to said consumer,
    wherein said indicium of value is also stored in said financial account;
    receiving, by said computer using said offer management application, a data packet containing a code representing a redemption request for said indicium of value, wherein said indicium of value includes said code;
    authenticating, by said computer using said offer management application conducting a validate operation and based upon said redemption request and said ID information, said indicium of value;
    sending, by said computer using said offer management application, a data packet including an authorization of said redemption, wherein using a completion operation at least a portion of said authorized amount is used to fund a first portion of a financial transaction at said merchant system,
    wherein using a balance operation said consumer transmits a data packet with instructions for charging a second portion of said financial transaction to said financial account of said consumer,
    wherein said computer obtains said second portion from a financial account issuer system that issued said financial account of said consumer; and sharing, by said computer using said offer management application, a data packet of information related to said financial transaction with said merchant system, and said financial account issuer system.

2. The method of claim 1, further comprising obtaining said authentication from one or more of:
   verification of said indicium of value at said third party processor; and
   communicating with one or more financial institutions associated with said indicium of value.

3. The method of claim 1,
   wherein a coupon issuer sends an approval request to a payment gateway, said payment gateway receives approval from said financial account issuer via said third party processor, and said payment gateway sends said approval to said coupon issuer,
   wherein, in response to receipt of said approval, said coupon issuer sends a settlement request to said payment gateway,
   wherein said coupon issuer sends funding to said third party processor minus coupon issuer fees, and
   wherein said third party processor sends remaining funding, minus third party processor fees to said payment gateway.

4. The method of claim 1,
   wherein in response to said first portion of said financial transaction exceeding said authorized amount, inspecting, by said computer, said indicium of value for an additional value approved for use by said customer,
   wherein in response to finding said additional value, sending, by said computer, an authorization based upon said additional value, and
   wherein said additional value is applied to said second portion of said financial transaction.

5. An article of manufacture including a non-transitory, tangible computer readable storage medium having instructions stored thereon that, in response to execution by a third-party processor computer, cause said third-party processor computer to be capable of performing operations comprising:
   receiving, by said computer using an offer management application and from a website associated with a merchant system of a merchant, computer code in a data packet that represents a purchase request to purchase an indicium of value for use at said merchant system,
   wherein said indicium of value is issued to said customer, in response to said financial transaction computer checking with said merchant system to determine that a tipping point of a predetermined number of said indicia of value were issued,
   wherein said data packet that represents said purchase request comprises identification (ID) information including data fields which identify said merchant, an authorized amount, consumer name, consumer address and consumer date of birth;
   receiving, by said computer using said offer management application, an account request for a financial account, wherein said account request includes said ID information;
   determining, by said computer using said offer management application, that a number of said indicium of value is below a predetermined threshold;
   associating, by said computer using said offer management application and by flagging data in a database, said indicium of value with said identification (ID) information,
   including, by said computer using said offer management application, said ID information in an application for said financial account;
   sending, by said computer using said offer management application, a data packet including a request for approval of said application for said financial account;
   wherein said financial account is provided to said consumer,
   sending, by said computer using said offer management application, said indicium of value in an email to said consumer,
   wherein said indicium of value is also stored in said financial account;
   receiving, by said computer using said offer management application, a data packet containing a code representing a redemption request for said indicium of value, wherein said indicium of value includes said code;
   authenticating, by said computer using said offer management application conducting a validate operation and based upon said redemption request and said ID information, said indicium of value;
   sending, by said computer using said offer management application, a data packet including an authorization of said redemption, wherein using a completion operation at least a portion of said authorized amount is used to fund a first portion of a financial transaction at said merchant system,
   wherein using a balance operation said consumer transmits a data packet with instructions for charging a second portion of said financial transaction to said financial account of said consumer,
   wherein said computer obtains said second portion from a financial account issuer system that issued said financial account of said consumer; and
   sharing, by said computer using said offer management application, a data packet of information related to said financial transaction with said merchant system, and said financial account issuer system.

6. The computer readable storage medium of claim 5, further comprising obtaining said authentication from one or more of:
   verification of said indicium of value at said third party processor;
   and communicating with one or more financial institutions associated with said indicium of value.

7. A computer system comprising:
   a processor,
   a tangible, non-transitory memory configured to communicate with said processor,
   said tangible memory having instructions stored thereon that, in response to execution by said processor, cause said processor to be capable of performing operations comprising:
   receiving, by said processor using an offer management application and from a website associated with a merchant system of a merchant, computer code in a data packet that represents a purchase request to purchase an indicium of value for use at said merchant system,
   wherein said indicium of value is issued to said customer, in response to said financial transaction computer checking with said merchant system to determine that a tipping point of a predetermined number of said indicia of value were issued,
   wherein said data packet that represents said purchase request comprises identification (ID) information including data fields which identify said merchant, an authorized amount, consumer name, consumer address and consumer date of birth;

receiving, by said processor using said offer management application, an account request for a financial account, wherein said account request includes said ID information;

determining, by said processor using said offer management application, that a number of said indicium of value is below a predetermined threshold;

associating, by said processor using said offer management application and by flagging data in a database, said indicium of value with said identification (ID) information, including, by said processor using said offer management application, said ID information in an application for said financial account;

sending, by said processor using said offer management application, a data packet including a request for approval of said application for said financial account;

wherein said financial account is provided to said consumer, sending, by said processor using said offer management application, said indicium of value in an email to said consumer, wherein said indicium of value is also stored in said financial account;

receiving, by said processor using said offer management application, a data packet containing a code representing a redemption request for said indicium of value, wherein said indicium of value includes said code;

authenticating, by said processor using said offer management application conducting a validate operation and based upon said redemption request and said ID information, said indicium of value;

sending, by said processor using said offer management application, a data packet including an authorization of said redemption, wherein using a completion operation at least a portion of said authorized amount is used to fund a first portion of a financial transaction at said merchant system, wherein using a balance operation said consumer transmits a data packet with instructions for charging a second portion of said financial transaction to said financial account of said consumer, wherein said processor obtains said second portion from a financial account issuer system that issued said financial account of said consumer; and sharing, by said processor using said offer management application, a data packet of information related to said financial transaction with said merchant system, and said financial account issuer system.

8. The computer system of claim 7, further comprising obtaining said authentication from one or more of:

verification of said indicium of value at said third party processor; and communicating with one or more financial institutions associated with said indicium of value.

* * * * *